Oct. 3, 1933.  S. W. BATH  1,929,268
AUTOMATIC REVERSING MECHANISM
Filed July 17, 1931   3 Sheets-Sheet 1

Oct. 3, 1933.  S. W. BATH  1,929,268

AUTOMATIC REVERSING MECHANISM

Filed July 17, 1931     3 Sheets-Sheet 2

Inventor
Stanley W. Bath
By attorneys
Southgate Fay & Hawley

Inventor
Stanley W. Bath.

Patented Oct. 3, 1933

1,929,268

UNITED STATES PATENT OFFICE 1,929,268

AUTOMATIC REVERSING MECHANISM

Stanley W. Bath, Shrewsbury, Mass., assignor, by mesne assignments, to John Bath & Company, Worcester, Mass., a corporation of Massachusetts Application July 17, 1931. Serial No. 551,538

13 Claims. (Cl. 74—14)

This invention relates to mechanism for shifting a mechanical element alternately from one to the other of two predetermined operative positions. The invention is capable of general application but is shown herein as adapted to the control and reversal of hydraulic table-operating mechanism.

It is the general object of my invention to provide improved mechanism for automatically reversing the position of a machine element such as a control valve.

A further object of the invention is to provide improved mechanism by which a delayed but very rapid movement of the actuated part will take place.

My invention further relates to arrangements and combinations of parts which will be hereinafter described and more particularly pointed out in the appended claims.

A preferred form of the invention is shown in the drawings, in which

Fig. 6 is a detail front elevation showing certain of the parts of Fig. 1 but in a different operative position.

Figure 1:
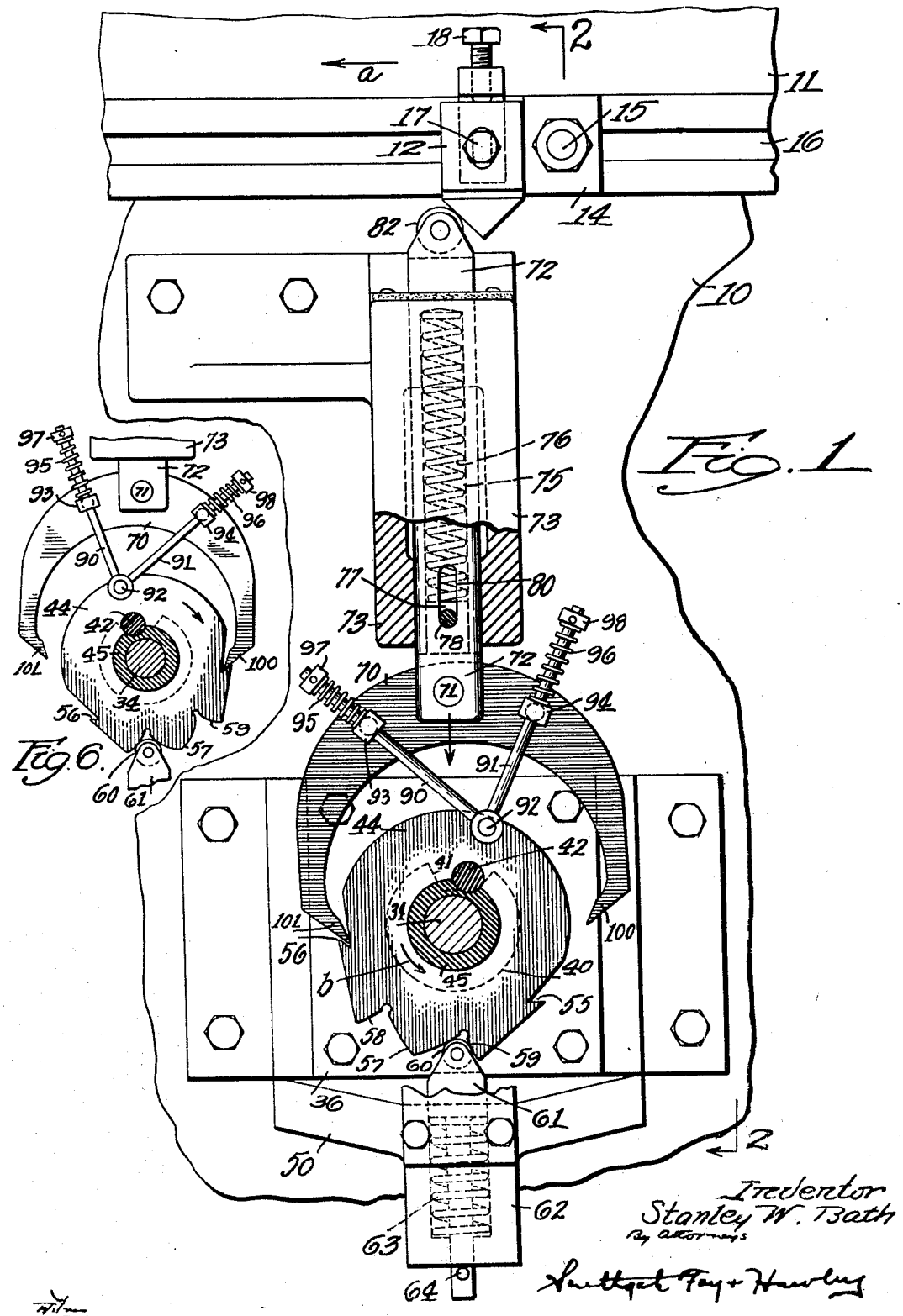
Fig. 1 is a front elevation, partly in section, of my improved reversing mechanism.

While my invention is capable of general application, I have shown the invention as adapted for reversing a valve which controls hydraulic mechanism for reciprocating a table in a grinding machine or other machine tool.

In the drawings, I have shown a portion of a bed or frame 10 (Fig. 1) on which a table 11 is reciprocated by any usual hydraulic actuating mechanism. A reversing dog 12 is mounted for vertical adjustment on a support 14 which is secured by a bolt 15, the head of which is positioned in a T slot 16 (Fig. 2). The dog 12 is secured to the block 14 by a clamping bolt 17 and may be adjusted downward by turning an upper adjusting screw 18.

It will be understood that a reversing dog 12 is provided at each end of the path of travel of the table 11, although only one dog 12 is shown in the drawings.

The hydraulic table-operating mechanism is controlled by the flow of liquid from one or the other of two feed pipes 20 and 21 (Fig. 4) to one or the other of two pipes 22 and 23 connected to deliver liquid under pressure to move the table 11 in opposite directions.

The pipes 20 and 21 are connected to ports 24 and 25 (Fig. 4) in a sleeve or lining 26 fixed in a valve block or casing 27. The pipes 22 and 23 are similarly connected to additional ports 28 and 29 in the sleeve 26. A valve member 30 is rotatably mounted in the sleeve 26 and is provided with two transverse passages 31 and 32.

Figure 4:
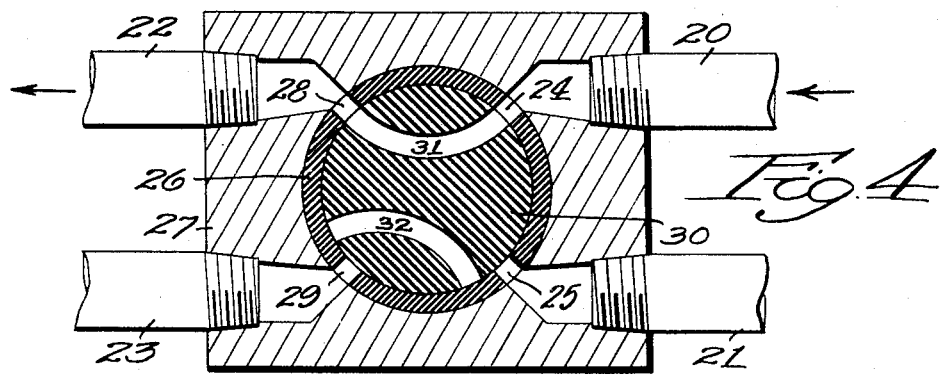
Fig. 4 is a detail sectional front elevation of a control valve, taken along the line 4—4 in Fig. 3.

When the valve member 30 is in the operative position shown in Fig. 4, liquid is delivered from the pipe 20 through the port 24, passage 31 and port 28 to the pipe 22 connected with the table-actuating mechanism. At the same time, the port 25 and supply pipe 21 is out of alignment with the passage 32, so that no liquid is delivered to the pipe 23.

Figure 5:
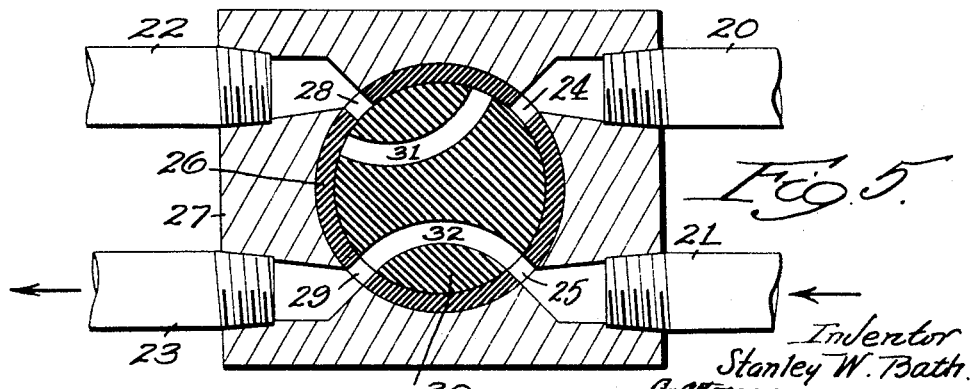
Fig. 5 is a view similar to Fig. 4 but showing the valve in a different position.

If the valve member 30 is moved to the position shown in Fig. 5, the connections are reversed and the supply pipe 21 is connected through the port 25, passage 32 and port 29 to the pipe 23, while the supply pipe 20 is simultaneously rendered inoperative.

The valve member 30 is mounted on a shaft 34 (Fig. 2) supported in a bearing 35 formed on a cover plate 36 mounted on the valve block 27. Suitable packing 38 is forced against the end of the bearing 35 by an adjustable cap 39 to prevent leakage from the valve casing.

A disc or collar 40 (Fig. 2) is fixed on the shaft 34 and is provided with a wide notch or recess 41 (Fig. 1) which loosely receives the end of a stud 42. The notch 41 is substantially wider than the diameter of the stud 42 so that a definite amount of lost motion is permitted.

The stud 42 extends through a disc or cam plate 44 (Fig. 2) and into the hub of a bushing 45. The disc 44 is thus fixed to the hub 45 by the stud 42 but the hub 45 is loosely mounted on the shaft 34.

A bracket 50 (Fig. 2) extends forwardly from the valve block or casing 27 and is provided with an end plate 51 which extends upwardly and forms an outer bearing for the shaft 34. The plate 51 also prevents axial displacement of the bushing 45 and disc 44.

The disc 44 (Fig. 1) is notched at its opposite sides to provide reversely disposed shoulders 55 and 56 (Fig. 1) and is also shaped in its lower portion to provide a cam projection 57, flanked by shoulders or abutments 58 and 59.

A cam roll 60 is mounted in the upper end of a plunger 61, slidable in a bearing portion 62 of the bracket 50. The plunger 61 is yieldingly forced upward by a coil spring 63 and upward movement of the plunger is limited by a cross-pin 64.

The roll 60 normally engages the disc 44 between the cam projection 57 and one of the abutments 58 or 59 and yieldingly holds the disc 44 from displacement until the disc is moved to its opposite position with a force sufficient to overcome the pressure of the spring 63. The two normal positions of the disc 44 correspond to the two operative positions of the valve 30, indicated in Figs. 4 and 5.

A double trip pawl 70 (Fig. 1) is pivoted at 71 to the lower end of a plunger 72, slidably mounted in a vertical bearing in a bracket 73 fixed to the frame or base 10 of the machine. An elongated recess 75 is provided in the plunger 72, which recess is closed at its upper end but is open at the lower end. A coil spring 76 is mounted in the recess 75 and at its lower end engages a cylindrical block 77, positioned in the recess 75 but held from axial movement by a cross-pin 78 fixed in the lower end of the bracket 73.

The plunger 72 is slotted on its opposite sides, as indicated at 80, to receive the cross-pin 78 and to permit axial movement of the plunger relative to the cross-pin. With this construction, the coil spring 76 yieldingly holds the plunger 72 in raised position but permits the plunger to be moved downward a limited distance when desired.

A cam roll 82 (Fig. 1) is mounted in the upper end of the plunger 72 in position for engagement by the dogs 12. A pair of links 90 and 91 (Fig. 1) are pivoted at 92 to the upper part of the disc 44 and are slidable in blocks 93 and 94, pivotally mounted in spaced relation in the double trip pawl 70.

Coil springs 95 and 96 are mounted on the links 90 and 91 and are secured thereon by collars 97 and 98. It will be noted that the pivot 92 of the links 90 and 91 is so positioned in the disc 44 that it is symmetrical with respect to the stud 42, the shoulders 55 and 56, the cam projection 57 and the abutments 58 and 59. The double trip pawl 70 is provided with end portions 100 and 101 adapted to engage the shoulders 55 and 56 respectively.

Figure 2:
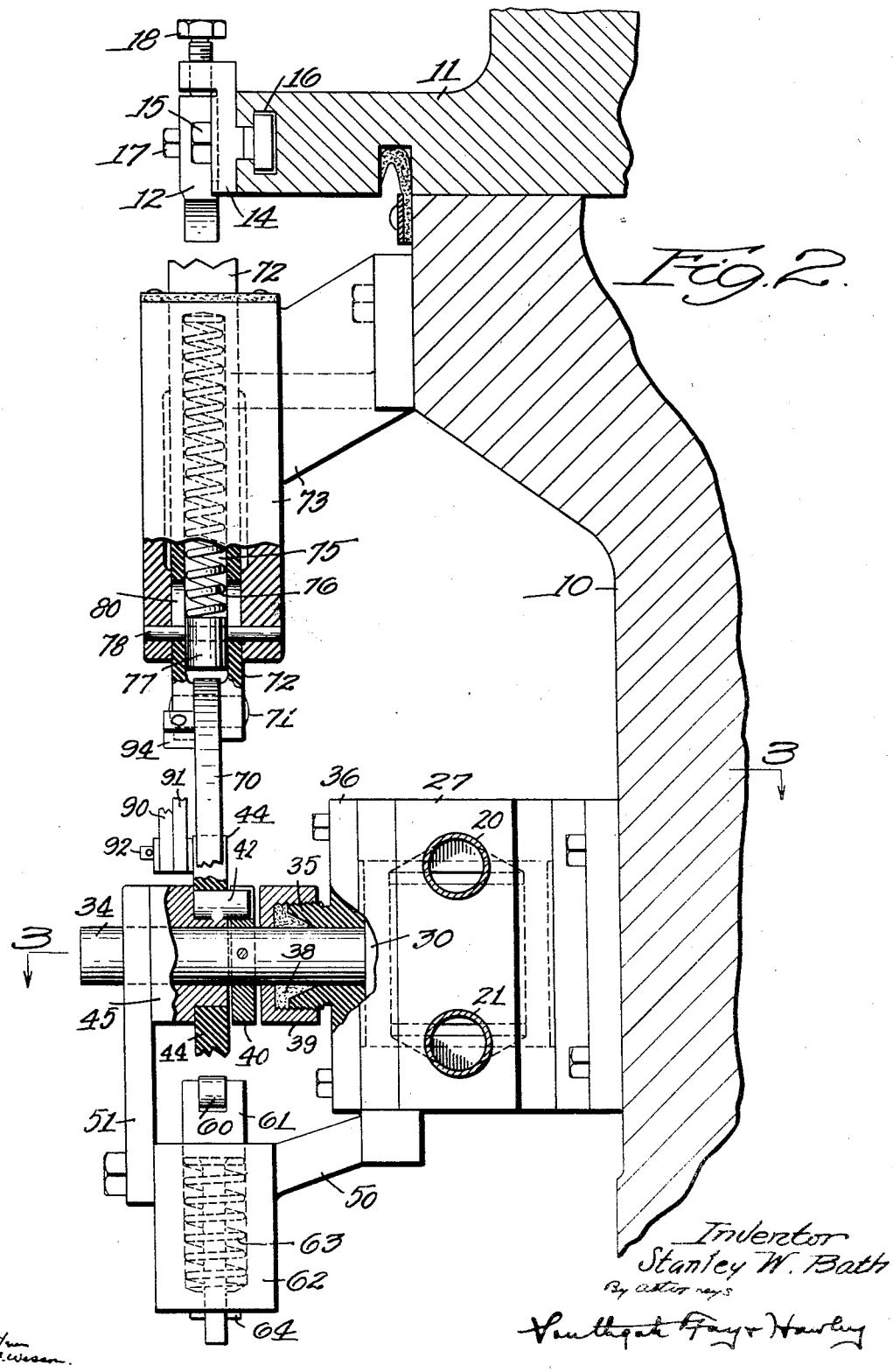
Fig. 2 is a sectional side elevation, taken substantially along the line 2—2 in Fig. 1.
Figure 3:
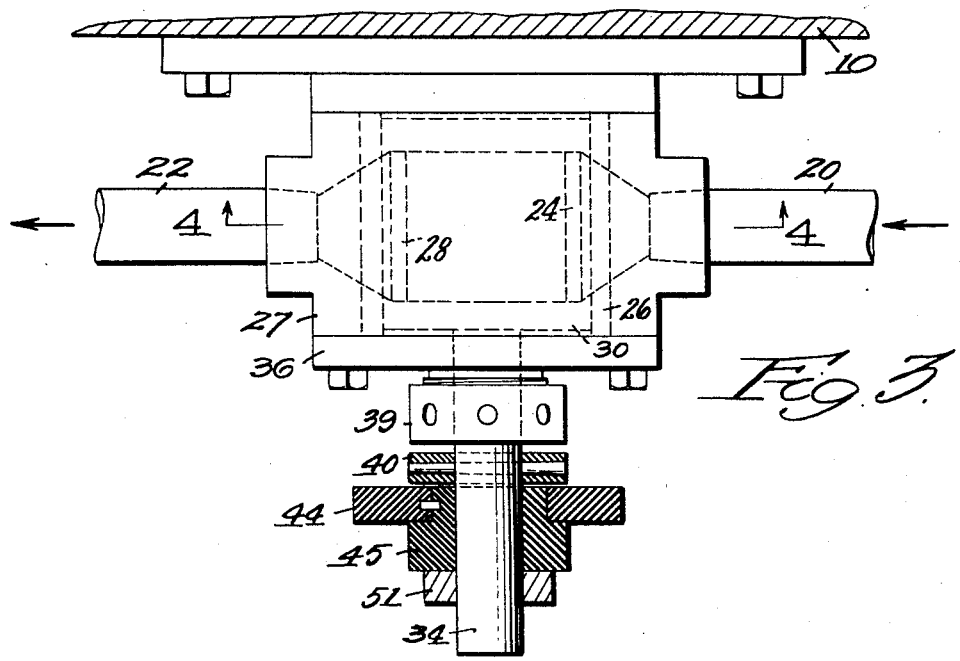
Fig. 3 is a sectional plan view, taken along the line 3—3 in Fig. 2.

Having described the construction of my improved reversing mechanism, the method of operation thereof is as follows:

Let it be assumed that the parts are in the position shown in Fig. 1, with the table 11 moving in the direction of the arrow a and with the valve member 30 in the position shown in Fig. 4. Any further movement of the table 11 to the left will cause the dog 12 to engage the roll 82 and depress the plunger 72 and the double trip pawl 70.

The end portion 101 of the double pawl 70 is in position to engage the shoulder 56 of the disc 44 and is held yieldingly in this position by the spring 95, which is under substantial compression, while the spring 96 is substantially uncompressed. Downward movement of the plunger 72 and double pawl 70 under these conditions will cause the disc 44 to be rocked in the direction of the arrow b in Fig. 1, depressing the roll 60 and plunger 61 and moving against the yielding resistance of the plunger.

During this initial movement, the stud 42 moves idly in the wide notch 41 in the collar 40, fixed to the valve shaft 34. Consequently no movement of the valve 30 takes place during this initial movement of the disc 44.

As the roll 60 reaches the point of the cam projection 57, the stud 42 engages the opposite side of the notch 41. As soon as the roll 60 passes the point of the cam projection 57, the disc 44 will complete its angular movement with a very rapid or snap action, due to the action of the spring 63. At the completion of the downward stroke, the parts are in the position shown in Figs. 5 and 6.

The quick reversal of the disc 44 causes the stud 92 to move to the left, as viewed in Figs. 1 and 6, thus putting the spring 96 under compression and relieving the pressure of the spring 95. As soon as the upward or return movement of the plunger 72 begins, this reversed condition of the springs 95 and 96 causes the double pawl 70 to swing in a clockwise direction, thus bringing the end portion 100 of the pawl into position to engage the shoulder 55 of the disc on the next downward movement of the pawl.

I have thus provided automatic reversing mechanism which will reverse the position of the disc 44 and valve 30 on each downward movement of the pawl 70, and which will reverse the operative position of the pawl 70 upon each return movement thereof.

While I have mentioned my device as being adapted for reversing the travel of a carriage or table, in which case two dogs 12 are used, the device may also be used for reducing or increasing the speed at definite points in the table travel in either or both directions. When used for this purpose, a single dog only may be used and by raising or lowering the point of this single dog, the device may be set to reverse the table at the same point in its travel in both directions, or at points which are at a predetermined and desired distance apart. By thus adjusting the dog, the device can be set to change the speed at points prior to or later than the common passing point. This is an important advantage which is not to my knowledge possessed by any reversing mechanism heretofore available.

While I have shown the disc 44 as connected to operate a hydraulic valve, it will be obvious that the disc may be connected to reverse the position of any other mechanism or device which is connected to the shaft 34.

The mechanism described has been found extremely satisfactory in use and operates very smoothly and efficiently and without objectionable jar or vibration.

Having thus described my invention and the advantages thereof, I do not wish to be limited to the details herein disclosed, otherwise than as set forth in the claims, but what I claim is:—

1. Automatic reversing mechanism comprising an angularly movable reversing element, an actuating device therefor having two different separate and definite operative positions and having working and idle return movements, means to give said device working and return movements, spring means effective to position said actuating device in one of its operative positions, and means to shift the effective pressure of said spring means before the return movement of said actuating device begins, said spring means thereafter moving said actuating device to its other operative position during the idle return movement of said device.

2. Automatic reversing mechanism comprising an angularly movable reversing element, an actuating device therefor having two different separate and definite engaging portions and having working and idle return movements, means to give said device working and return movements, spring means effective to position a selected portion of said actuating device in operative position, and means to shift the effective pressure of said spring means during the working movement of said actuating device, said spring means thereafter moving said actuating device to bring its other engaging portion to operative position during the idle return movement of said device.

3. Automatic reversing mechanism comprising an angularly movable reversing element having oppositely disposed shoulders, a double pawl having two different separate and definite operative positions and having working and idle return movements, means to give said double pawl working and return movements, spring means effective to operatively position said double pawl to engage a selected one of said shoulders, and means to shift the effective pressure of said spring means during the working movement of said double pawl, said spring means thereafter moving said double pawl to position to engage the other shoulder, such movement of said pawl being effected during the return movement of said pawl.

4. Automatic reversing mechanism comprising an angularly movable reversing element, a member slidable radially with respect to the axis of said element, means to move said member toward and away from said element, a double pawl pivoted on one end of said sliding member, said reversing element having reversely disposed shoulders positioned to be alternately engaged by said double pawl, a pair of links connected at one end to said reversing element, springs on said links and abutments on said double pawl engaged by said springs.

5. Automatic reversing mechanism comprising an angularly movable reversing element, a member slidable radially with respect to the axis of said element, means to move said member toward and away from said element, a double pawl pivoted on one end of said sliding member, said reversing element having reversely disposed shoulders positioned to be alternately engaged by said double pawl, a pair of links connected at one end to said reversing element at a point symmetrical with respect to said shoulders, springs on said links, and abutments on said double pawl engaged by said springs.

6. Automatic reversing mechanism comprising an angularly movable reversing element, a member slidable radially with respect to the axis of said element, means to move said member toward and away from said element, a double pawl pivoted on one end of said sliding member, said reversing element having reversely disposed shoulders positioned to be alternately engaged by said double pawl, a pair of links connected at one end to said reversing element, springs on said links, and abutments on said double pawl engaged by said springs, the reversing of said element in position shifting the effective spring pressure from one to the other of said abutments on said double pawl.

7. Automatic reversing mechanism comprising an angularly movable reversing element, a member slidable radially with respect to the axis of said element, means to move said member toward and away from said element, a double pawl pivoted on one end of said sliding member, said reversing element having reversely disposed shoulders positioned to be alternately engaged by said double pawl, a pair of links connected at one end to said reversing element, springs on said links, and abutments on said double pawl engaged by said springs, the reversing of said element in position shifting the effective spring pressure from one to the other of said abutments on said pawl, and said reversed spring pressure causing a reversal in the position of said double pawl during the idle return movement of said sliding member.

8. Reversing mechanism for hydraulically actuated apparatus comprising a reversing valve, a disc thereon having oppositely disposed shoulders, a member movable radially of said disc, a double pawl mounted on said member and having oppositely disposed disc-engaging portions, each adapted to engage one of said shoulders, means to move said member and pawl radially toward said disc to turn said disc and valve in one direction, and means to reverse the operative position of said pawl during the idle radial return movement of said member and pawl away from said disc.

9. The combination in a reversing mechanism as set forth in claim 8, in which said latter means comprises a pair of links pivoted to said disc, spaced guiding blocks for said links mounted on said pawl, and springs on said links engaging said blocks.

10. The combination in a reversing mechanism as set forth in claim 8, in which said latter means comprises a pair of links pivoted to said disc, spaced guiding blocks for said links mounted on said pawl, springs on said links engaging said blocks, and collars to hold said springs from displacement on said links.

11. Reversing mechanism for hydraulically actuated apparatus comprising a reversing valve, a disc thereon having oppositely disposed shoulders, a plunger movable radially of said disc, a double pawl mounted on said plunger and having oppositely disposed disc-engaging portions, each adapted to engage one of said shoulders, means to move said plunger and pawl radially toward said disc to turn said disc and valve in one direction, means to reverse the operative position of said pawl during the idle radial return movement of said plunger and pawl away from said disc, and a lost motion connection between said disc and said valve.

12. Reversing mechanism for hydraulically actuated apparatus comprising a reversing valve, a disc thereon having oppositely disposed shoulders, a plunger movable radially of said disc, a double pawl mounted on said plunger and having oppositely disposed disc-engaging portions, each adapted to engage one of said shoulders, means to move said plunger and pawl radially toward said disc to turn said disc and valve in one direction, means to reverse the operative position of said pawl during the idle radial return movement of said plunger and pawl away from said disc, and means to move said disc with a snap action during the final part of the operative movement of said pawl.

13. Automatic reversing mechanism for a reciprocating member comprising a reversing element, a contact device on said reciprocating member, means to shift the operative position of said reversing element, said means including a transmitting member engageable by said contact device and mounted for straight line bodily movement thereby in a direction substantially perpendicular to the direction of travel of said contact device, a spring to return said transmitting member to normal position after displacement by said contact device, said device having oppositely disposed cam faces alternately engaging said transmitting member, and means by which said contact device may be moved vertically on said reciprocating member toward or away from said transmitting member, whereby the time intervals between reversals of the reversing element occasioned by contact of said member with said device may be varied.

STANLEY W. BATH.